(12) United States Patent
Hand (10) Patent No.: US 11,493,191 B1
(45) Date of Patent: Nov. 8, 2022

(54) LIGHT FIXTURES WITH A PIVOTABLE MOUNTING HOOK

(71) Applicant: ABL IP Holding LLC, Atlanta, GA (US)

(72) Inventor: Mitchell C. Hand, McDonough, GA (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 17/330,990

(22) Filed: May 26, 2021

(51) Int. Cl.
  *F21V 21/08* (2006.01)
  *F16B 45/00* (2006.01)
  *F21Y 115/10* (2016.01)

(52) U.S. Cl.
  CPC .............. *F21V 21/08* (2013.01); *F16B 45/00* (2013.01); *F21Y 2115/10* (2016.08)

(58) Field of Classification Search
  CPC .... F21V 21/08; F21V 21/088; F21V 21/0885; F21S 8/026; F21S 8/063; F21Y 2115/10; F16B 45/00
  See application file for complete search history.

(56) References Cited

U.S. PATENT DOCUMENTS

| | | | | |
|---|---|---|---|---|
| 5,190,369 A | * | 3/1993 | Pace | F21L 15/02 362/186 |
| 7,325,944 B2 | * | 2/2008 | Kovacik | F21L 4/08 362/196 |
| 8,870,414 B2 | * | 10/2014 | Goeckel | F21V 21/14 362/249.03 |
| D794,234 S | * | 8/2017 | Levy | D26/37 |
| 2008/0174991 A1 | * | 7/2008 | Tucker | F21L 4/027 362/200 |

FOREIGN PATENT DOCUMENTS

DE  102011108709  *  1/2013  .............. F21V 21/30

OTHER PUBLICATIONS

DE 102011108709, Jan. 2013, Allgaier et al, English Translation (Year: 2013).*
"240 Watt LED High Bay UFO Corvus Series Lights—34,800 Lumen—DLC Premium Verified—3.3ft cord—5000K Bright White", LEDLightExpert.com, Available Online at: https://www.ledlightexpert.com/240-Watt-LED-High-Bay-UFO-Corvus-Series-Lights-34800-Lumen-DLC-Premium-Verified-33ft-cord-5000K-Bright-White_p_273.html?gclid=CjwKCAjwq9mLBhB2EiwAuYdMtZLB4BEym96spY, Accessed from Internet on Oct. 28, 2021, 5 pages.
"AOK", AOK-100WiU—Up to 350W Traditional Lamp Replacement, Available online at: https://aok.lighting/2016-aok-100wiu-up-to-350w-traditional-lamp-replacement, Accessed from Internet on Oct. 19, 2021, 4 pages.

(Continued)

*Primary Examiner* — Peggy A Neils
(74) *Attorney, Agent, or Firm* — Kilpatrick Townsend & Stockton LLP (57) ABSTRACT

An housing for use with a light fixture is described with a housing body and a mounting hook. The housing body can have an upper surface and a hook mounting hub exposed on the upper surface. The mounting hook can be rotatably coupled to the hook mounting hub and adapted to rotate between a stowed position where the hook lies substantially flush or proximate with the upper surface of the housing body and an upraised position where the hook extends upwardly from the upper surface of the housing body.

20 Claims, 9 Drawing Sheets

(56) References Cited

OTHER PUBLICATIONS

"Heqing Lighting HQ UFO Lights", Available Online at: www.heqingled.com/en/productl977.html, Accessed from Internet on Oct. 19, 2021, 3 pages.

"Hyperikon UFO 40 in. 600 Watt Equivalent Integrated LED Black High Bay Light 5000K-HyperUFOE150-50", The Home Depot, Available Online at https://www.homedepot.com/p/Hyperikon-UFO-40-in-600-Watt-Equivalent-Integrated-LED-Black-High-Bay-Light-5000K-HyperUFOE150-50/310303275, Accessed from Internet on Oct. 19, 2021, 2 pages.

"JEBL LED Affordable Round LED High Bay Lighting", Lithonia Lighting, 2018, 2 pages.

"LED High Bay Light Manufacturers and Factory—CE LED High Bay Light—Ledia Lighting", Available Online at: https://web.archive.org/web/20171206104220/http://www.ledialighting.com:80/led-high-bay-light-1, Accessed from Internet on Oct. 19, 2021, 1 page.

"LED lighting fixture-UL LED Highbay Light", ENEC highbay light—PSE highbay light- Hipower, Available Online at: https://web.archive.org/web/20190612034057/https://hipowerled.com/productshow.asp?bigclass=1&productsort=10&id=4, Accessed from Internet on Oct. 19, 2021, 3 pages.

"RAB Lighting", BAYLED78YW, Available Online at: https://web.archive.org/web/20170406055537/http://www.rabweb.com/product.php?product=BAYLED78YW, Accessed from Internet on Oct. 18, 2021, 4 pages.

"VCMAG 2 Pcs UFO LED High Bay Light, 100W, 12000 LM (Eqv. 400W HID/HPS) 5000K Daylight, IP65, Commercial Warehouse/Workshop/Wet Location Area Lighting Fixture, Non-Dim, 5ft Cable with US Plug", Amazon, Available Online at: https://www.amazon.com/dp/B08KNYN6X7?tag=barcodeindex-20&linkCode=osi&th=1&psc=1, Accessed from Internet on Oct. 28, 2021, 8 pages.

\* cited by examiner

LIGHT FIXTURES WITH A PIVOTABLE MOUNTING HOOK

FIELD OF INVENTION

The present technology relates to light fixtures, and more particularly to light fixtures with a pivotable hook that can be deployed for light fixture installation and stowed for storage and shipment.

DESCRIPTION OF THE RELATED ART

Light fixtures are used in residential and commercial locations and may be used for various illumination purposes, including wall wash illumination, accent lighting of a specific object, and general ambient illumination. Some light fixtures are installed with a hook that must be threadably mounted on the light fixture prior to installation. The separate hook must be separately secured during transit and requires use of larger packaging and shipping containers to accommodate it. Additionally, having the mounting component separated from the body of the light fixture requires additional assembly at a job site. The separate component has a risk of being lost or going missing and introduces additional complications to the installation process. There is a need for an improved mounting system.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention relate to an electronics housing with a housing body, and a mounting hook. The housing body can have an upper surface and a hook mounting hub exposed on the upper surface. The mounting hook can rotatably couple to the hook mounting hub to form a rotation axis between the mounting hook and the hook mounting hub. The mounting hook can rotate about the rotation axis from a stowed position, where the mounting hook is substantially flat with the upper surface of the housing body to an upraised position where the mounting hook extends upwardly from the upper surface of the housing body.

Aspects of the electronics housing can include some or all of the following. The electronics housing can further include a locking mechanism provided on the electronics housing, where the locking mechanism is configured to retain the mounting hook in at least one of the upraised position or the stowed position when the mounting hook engages the locking mechanism. The locking mechanism can include at least one locking spring, the at least one locking spring including a receiving slot. The mounting hook can include at least one locking protrusion adapted to engage the receiving slot to lock the mounting hook in at least one of the stowed position or the upraised position. The at least one locking spring can include a first locking spring and a second locking spring, where the at least one locking protrusion includes two first locking protrusions and two second locking protrusions, where the hook base includes two hook arms, where each of the two hook arms includes one of the two first locking protrusions and one of the two second locking protrusions, where each of the two first locking protrusions is adapted to engage the receiving slot of one of the first locking spring or the second locking spring when the mounting hook is in a stowed position and where each of the two second locking protrusions is adapted to engage the receiving slot of the one of the first locking spring or the second locking spring when the mounting hook is in an upraised position. The hook base can include two hook arms and the mounting hook is rotatably coupled to the hook mounting hub by the two hook arms. Each of the two hook arms can include an engagement pin that engages at least one cavity defined by the hook mounting hub. The mounting hook can be rotatable within an approximately 180 rotation range. The mounting hook can be rotatable within an approximately 90 rotation range. The hook mounting hub can include a rotation stop adapted to limit a rotation range of the mounting hook.

Embodiments of the present invention relate to a light fixture with at least one lighting element, electronics for powering the light emitting element, and a housing with a housing body, and a mounting hook. The housing body can have an upper surface and a hook mounting hub exposed on the upper surface. The mounting hook can rotatably couple to the hook mounting hub to form a rotation axis between the mounting hook and the hook mounting hub. The mounting hook can rotate about the rotation axis from a stowed position, where the mounting hook is substantially flat with the upper surface of the housing body to an upraised position where the mounting hook extends upwardly from the upper surface of the housing body.

Aspects of the light fixture can include some or all of the following. The at least one light emitting element can include a plurality of light emitting diodes. The housing can house the electronics. The housing can further include a locking mechanism provided on the housing, where the locking mechanism is configured to retain the mounting hook in at least one of the upraised position or the stowed position when the mounting hook engages the locking mechanism. The locking mechanism can include at least one locking spring, the locking spring including a receiving slot. The at least one locking spring can include a first locking spring and a second locking spring, where the at least one locking protrusion includes two first locking protrusions and two second locking protrusions, where the hook base includes two hook arms, where each of the two hook arms includes one of the two first locking protrusions and one of the two second locking protrusions, where each of the two first locking protrusions is adapted to engage the receiving slot of one of the first locking spring or the second locking spring when the mounting hook is in a stowed position and where each of the two second locking protrusions is adapted to engage the receiving slot of the one of the first locking spring or the second locking spring when the mounting hook is in an upraised position. The hook base can include two hook arms and the mounting hook can be rotatably coupled to the hook mounting hub by the two hook arms. Each of the two hook arms can include an engagement pin that engages at least one cavity defined by the hook mounting hub. The mounting hook can be rotatable within an approximately 90 rotation range.

A mounting hook that is configured to be rotatable from a stowed position to an upraised position can allow for ease of packing and storing the light fixtures. Moreover, a mounting hook that can be packed while attached to the housing body provides for fewer loose parts in transport and in storage and thus, less subject to part or component loss.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Figure 1:
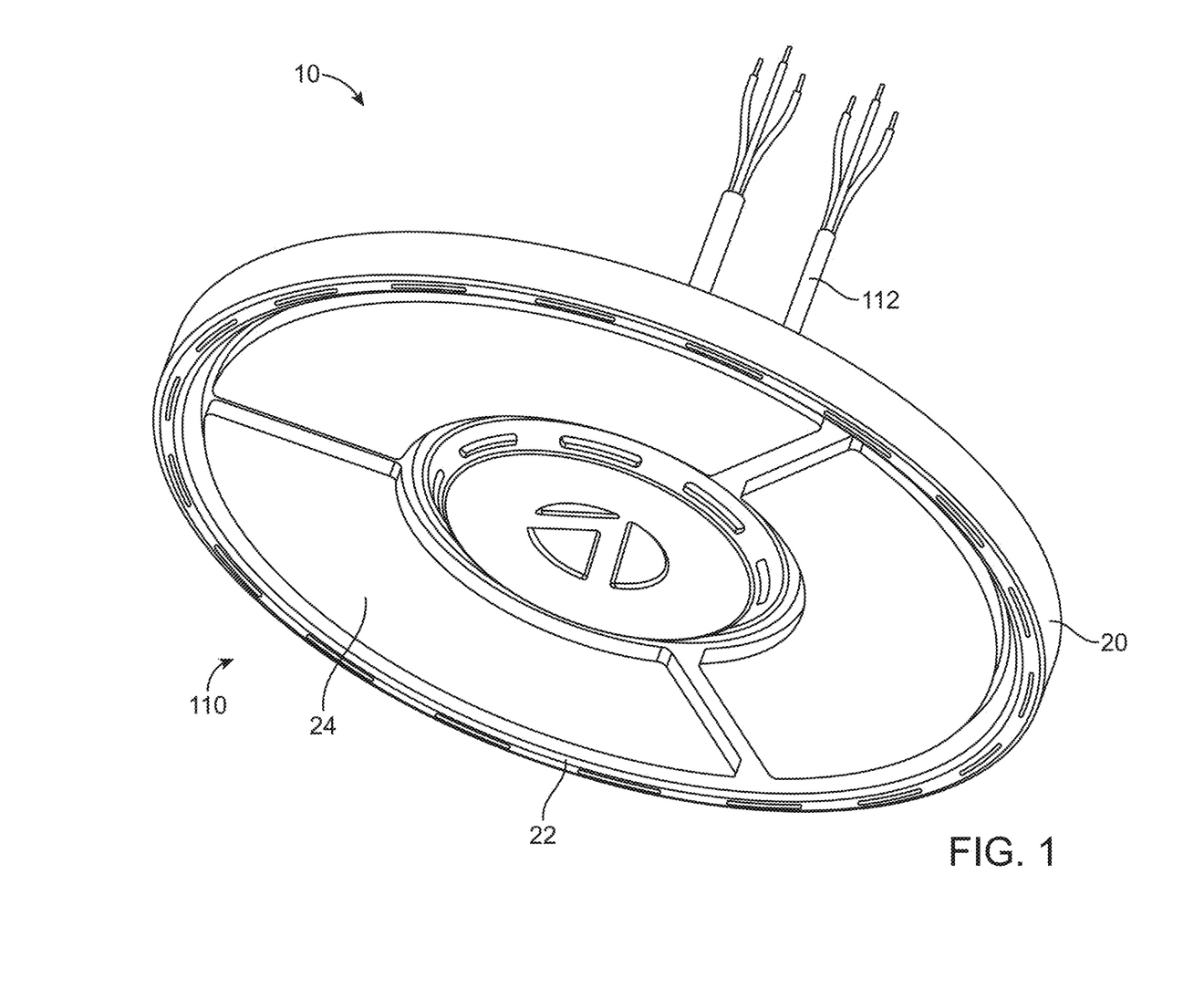
FIG. 1 shows a bottom perspective view of an embodiment of a light fixture.
Figure 2:
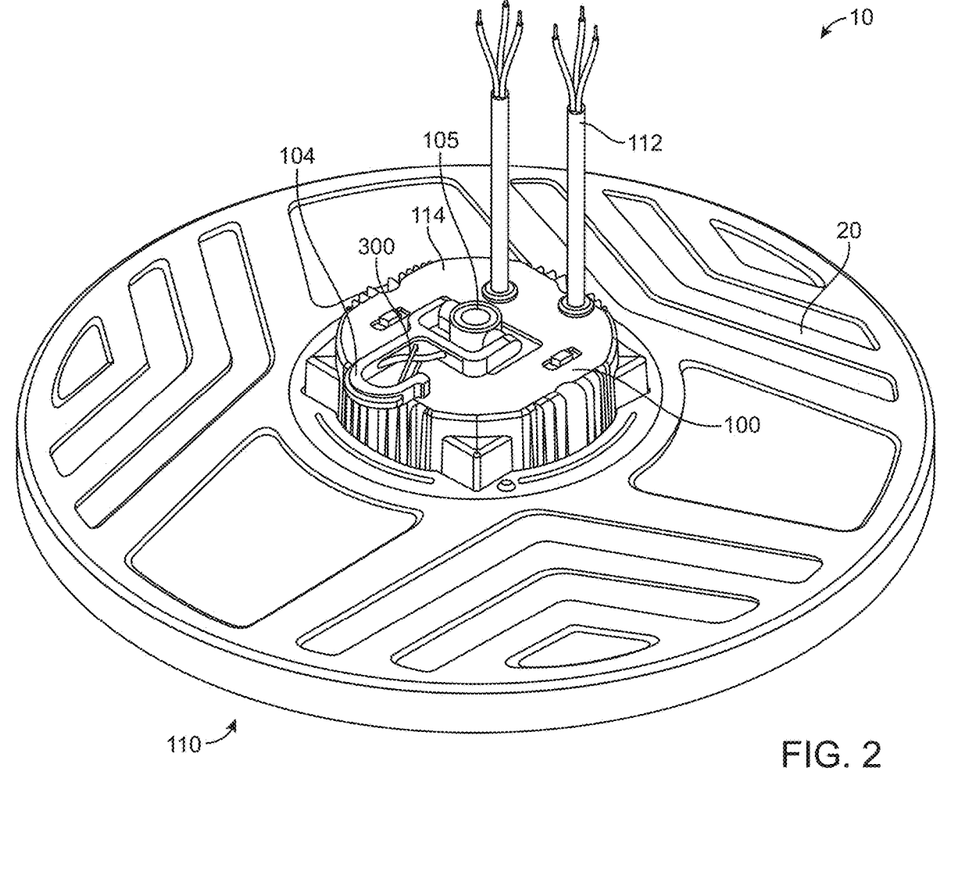
FIG. 2 shows a top perspective view of the light fixture of FIG. 1.
Figure 3:
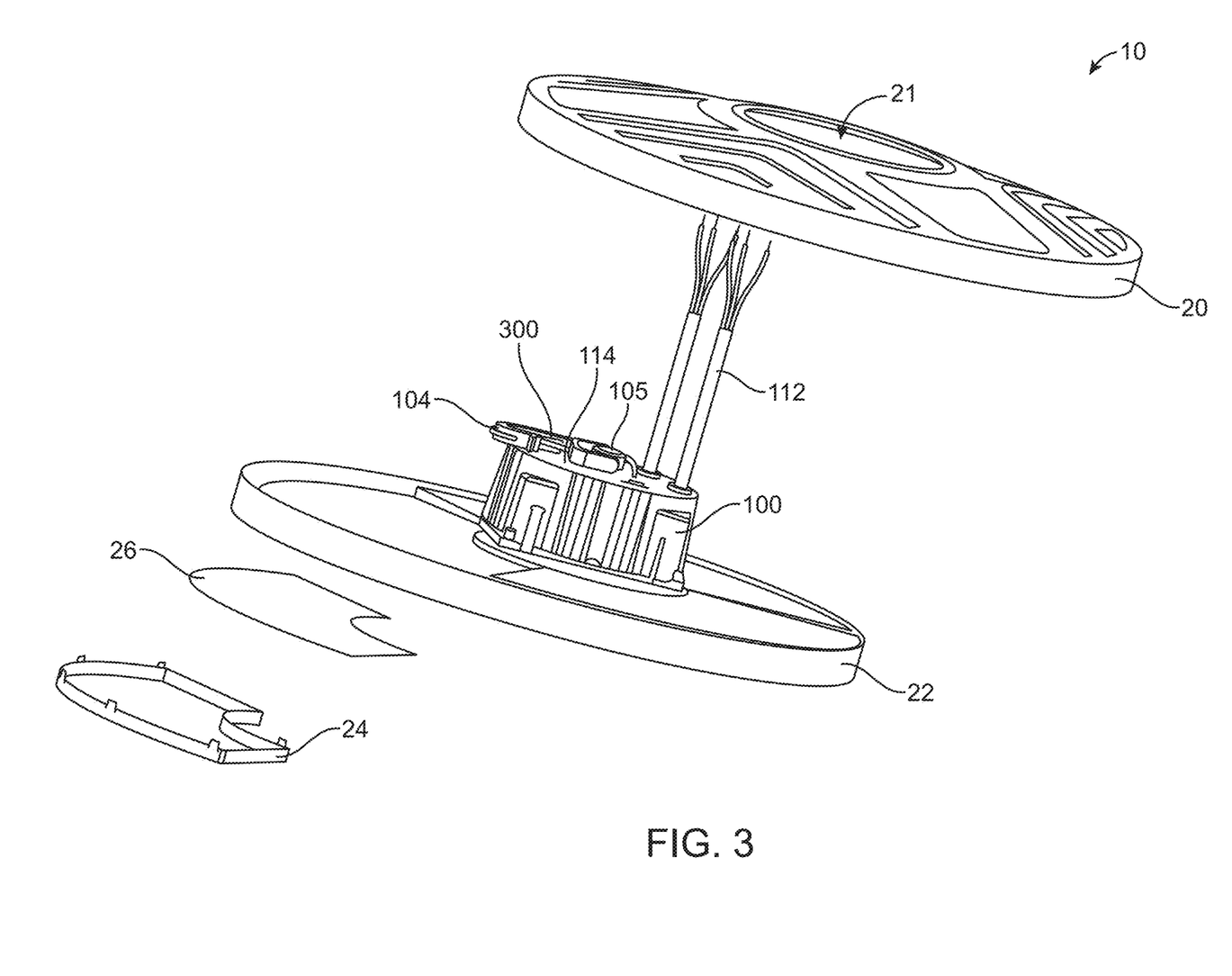
FIG. 3 shows a partially exploded of the light fixture of FIG. 1.

FIGS. 1-3 show an embodiment of a light fixture 10 that includes a base 22, a rear cover 20, and an electronics housing 100. While these components are illustrated as separate parts that are attached together, in other embodiments some or all of them can be formed integrally. For example, in some embodiments the light fixture 10 has a one piece cast housing.

The base 22 houses light source(s) (e.g., LEDs mounted on a PCB 26) and/or optical components 24 (e.g. reflectors, baffles, lenses, etc.) for controlling the appearance and/or directionality of the light emitted from the light fixture 10 via light exit side 110. The LEDs may be single-die or multi-die LEDs, DC or AC, or can be organic light emitting diodes. White, color, or multicolor LEDs may be used. Moreover, the LEDs mounted on a PCB need not all be the same color; rather, mixtures of LEDs may be used. Furthermore, in some embodiments no PCB is needed; rather, the LEDs are chip-on-board LEDs provided directly on the underside of the base 22. While LEDs mounted on a PCB are disclosed, other types of light sources (e.g., fluorescent bulbs, incandescent bulbs, etc.) could be provided in the light fixture 10.

The electronics housing 100 is mounted on the rear of the base 22 and houses the electronics for powering and/or controlling the light sources (e.g. driver, circuitry, etc.). Input power lines and/or other wiring 112 may extend into the electronics housing 100 to connect to the power sources (e.g. drivers) and/or other electronics for powering and controlling the light sources. The rear cover 20 is positioned over the rear of the base 22 to impart a polished appearance to the light fixture 10. An aperture 21 is defined in the rear cover through which the electronics housing 100 can extend. While a downlight fixture is illustrated, in some embodiments the light fixture is an uplight fixture such that light is emitted upwardly when the light fixture is installed. In still other embodiments, the light fixture is both an uplight and a downlight fixture. The light fixture 10 is shown with a generally rounded design, but could have any suitable shape or configuration.

Figure 4:
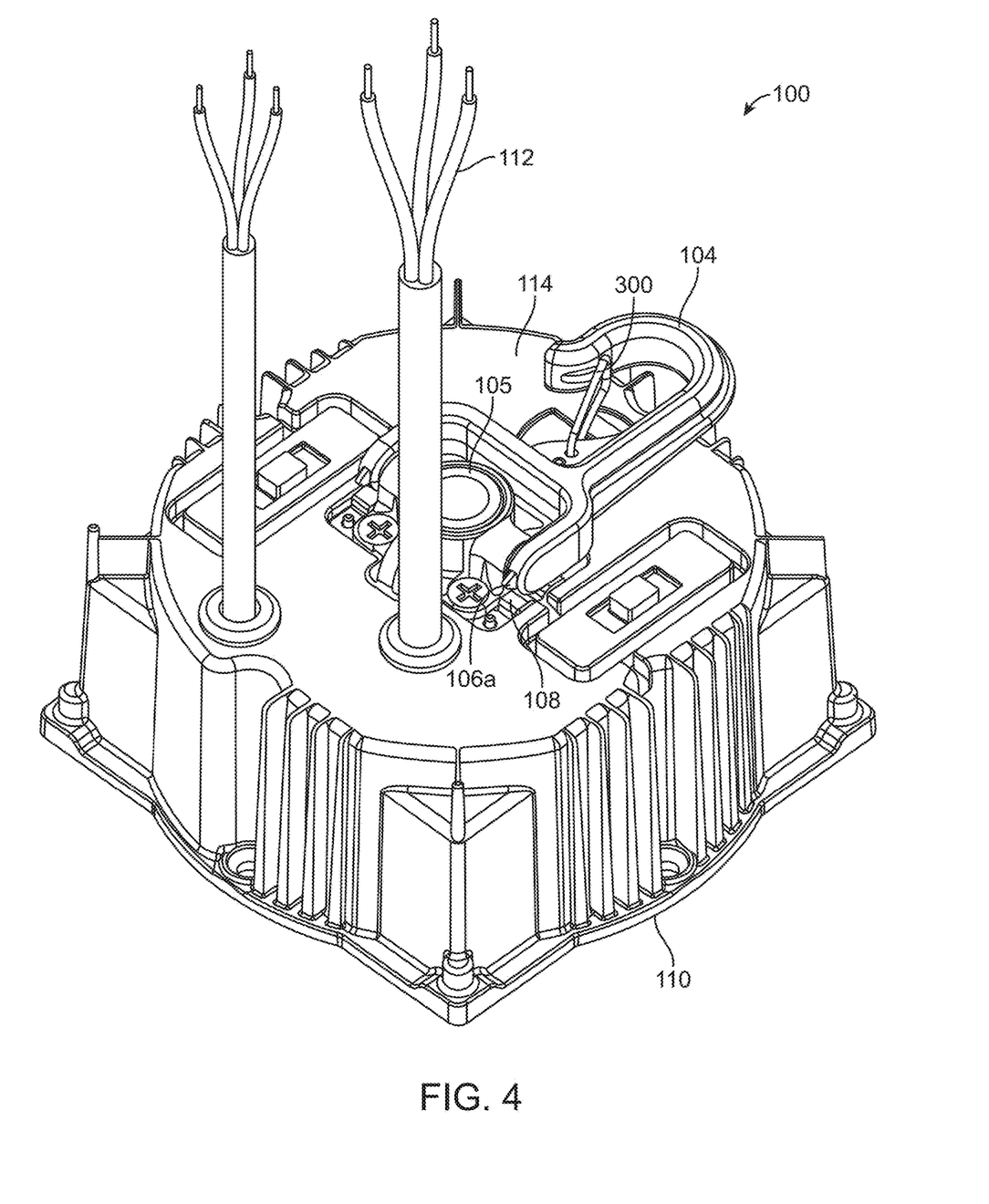
FIG. 4 shows a top perspective view of the electronics housing of FIG. 1 in isolation with an embodiment of a pivotable hook in a stowed orientation.
Figure 5:
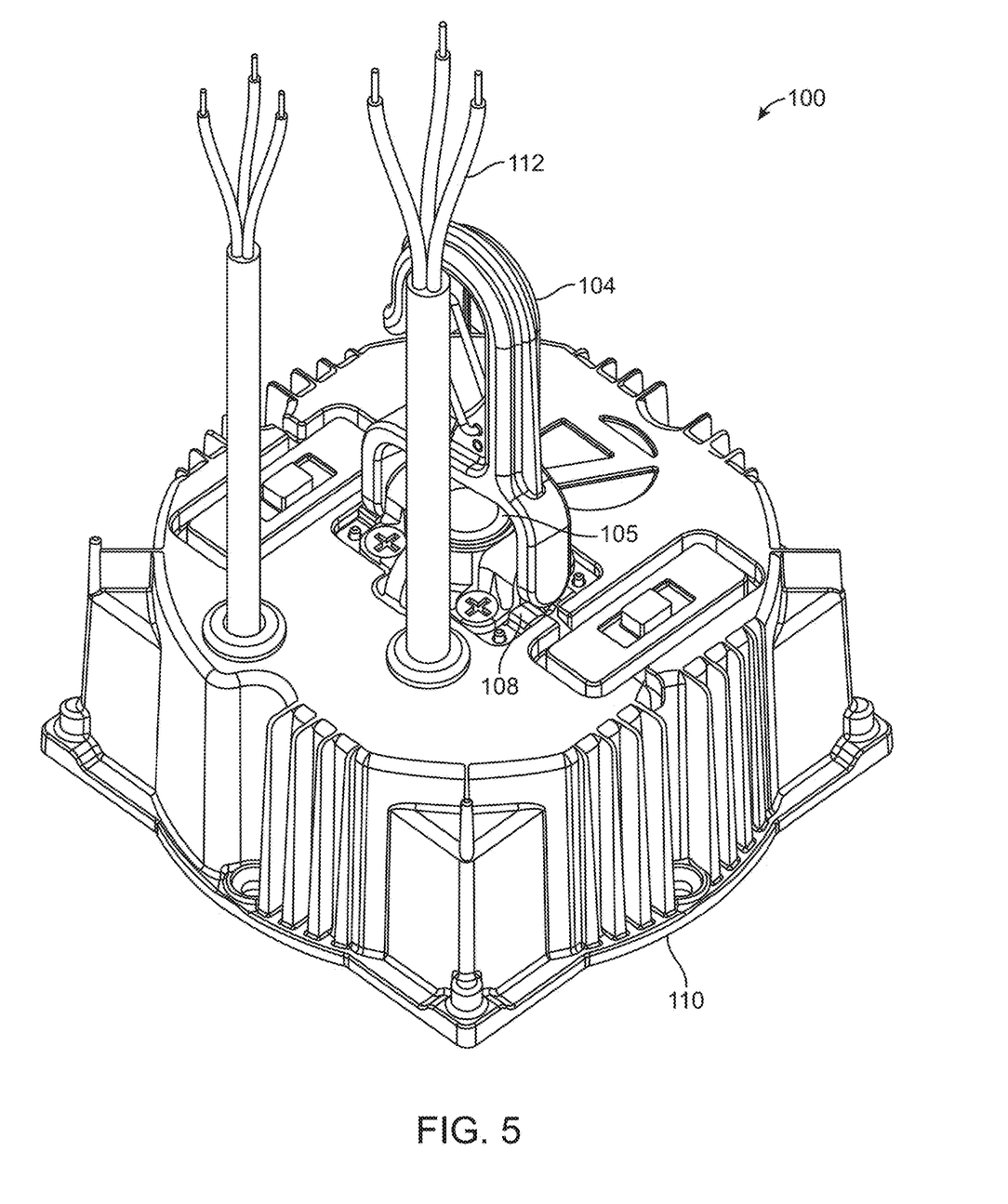
FIG. 5 shows a top perspective view of the electronics housing of FIG. 4 with the pivotable hook in an upright position.
Figure 6:
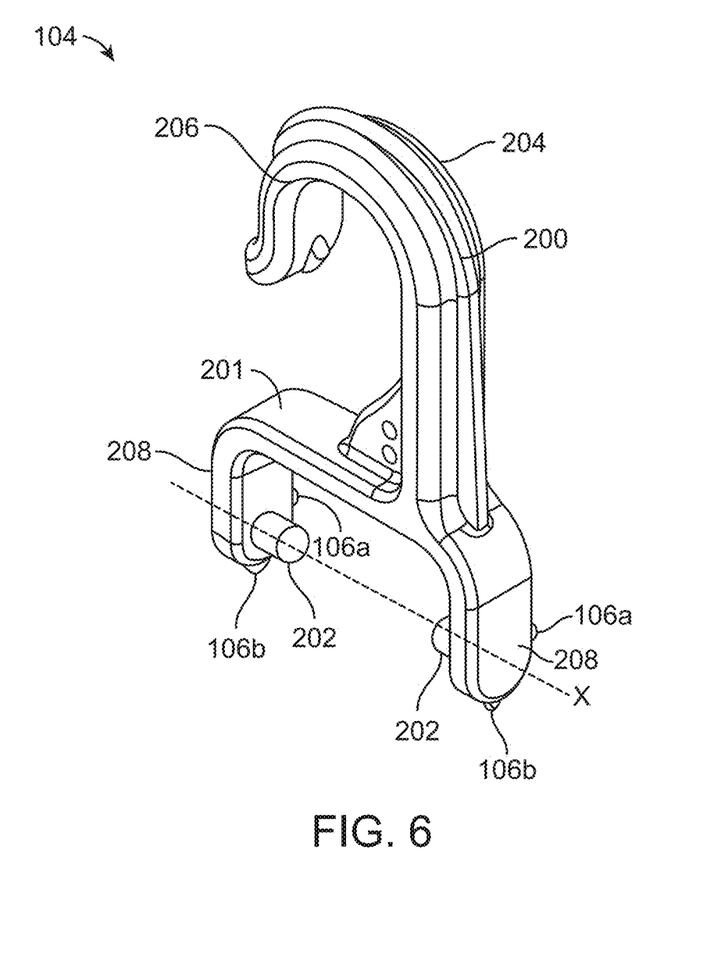
FIG. 6 shows a perspective view of the hook of FIG. 4 in isolation.
Figure 7:
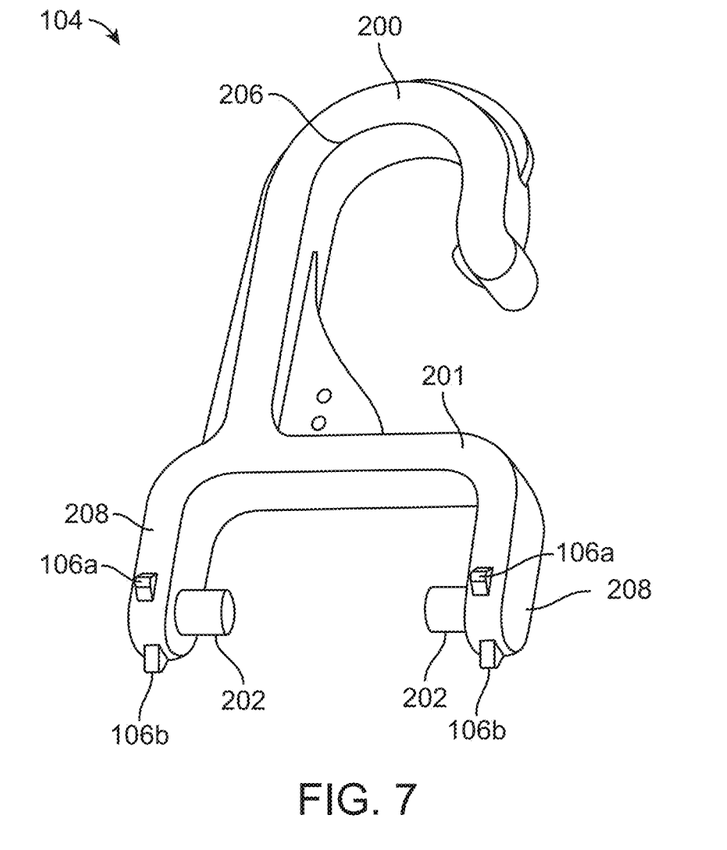
FIG. 7 shows another perspective view of the hook of FIG. 6 in isolation.
Figure 8:
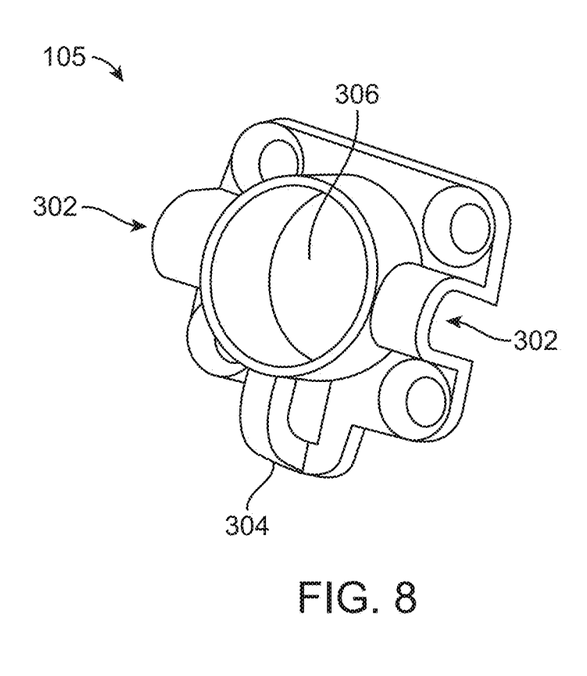
FIG. 8 shows a perspective view of an embodiment of a mounting hub in isolation.

As best seen in FIGS. 4 and 5, a mounting hook 104 is pivotably mounted on the light fixture 10. In the illustrated embodiment, the mounting hook 104 is pivotably mounted on the electronics housing 100 but it could be mounted on other structure of the light fixture 10. A mounting hub 105 is provided on the upper surface 114 of the electronics housing 100 (opposite the light exit side 110). As best seen in FIG. 8, the mounting hub 105 includes cavities 302 on its opposing sides and a rotation stop 304, the purpose of which is described below. As best seen in FIGS. 6 and 7, the mounting hook 104 generally includes a hook portion 200 and a hook base 201 that includes two downwardly extending arms 208. An engagement pin 202 extends inwardly from an inner surface of each arm 208. During manufacture, the mounting hook 104 is pivotably connected to the mounting hub 105 by inserting the engagement pins 202 on the mounting hook 104 into the cavities 302 of the mounting hub 105. The mounting hook 104 can pivotably rotate about a rotation axis x (defined by the engagements pins 202 and cavities 302) between a stowed position whereby the mounting hook 104 lies substantially flush or proximate with the upper surface 114 of the electronics housing 100 (see FIG. 4) and an upraised position where the mounting hook is in position for mounting (see FIG. 5). Note that other means for pivotably connecting the mounting hook 104 to the electronics housing 100 may be used. For example, in some embodiments the integrated mounting hook 104 can be connected by a rotation joint, by a tube passing through, by a swivel, or any suitable connection means for establishing a pivot about the connection.

By pre-mounting of the mounting hook 104 onto the light fixture 10, the light fixture 10 can be packaged and shipped in an assembled state. Thus, the light fixture 10 arrives to the installation site with the mounting hook 104 already assembled on it such that an end user of the light fixture 10 does not need to assemble the mounting hook 104 onto the light fixture 10. Rather, the installer just pivots or rotates the mounting hook 104 upwardly, and the light fixture 10 is ready to be installed.

In some embodiments, the mounting hook 104 is free to pivot or rotate between about 0° to about 180° about the rotation axis x. In such embodiments, the mounting hook 104 can be rotated from a first position whereby its first side 204 lies flush or proximate with the electronics housing 100 (see FIG. 4) to a second position whereby its opposing second side 206 lies flush or proximate with the electronics housing 100. However, in some embodiments, rotation of the mounting hook 104 is constrained such that the mounting hook 104 is only able to rotate between about 0° (where it lies flush with the electronics housing 100) up to about 90° where it extends substantially perpendicular from the electronics housing 102. For example, in the illustrated embodiment (see FIG. 8), the mounting hub 105 includes an upstanding rotation stop 304. If the mounting hook 104 is rotated beyond a certain point, the hook base 201 of the mounting hook 104 will abut the rotation stop 304, thus preventing further rotation of the mounting hook 104. Thus, the rotation stop 304 is adapted to limit the rotation range of the mounting hook based on its shape. In some aspects, the rotation stop 304 can be shaped to allow for a safety tether to be attached for a point of securement during installation of the light fixture 10. While the rotation stop 304 is shown with a curved profile, any suitable shape to prevent hyperrotation and/or additionally provide an attachment point during installation, such as a square, a loop, or otherwise, may be used.

Figure 9:
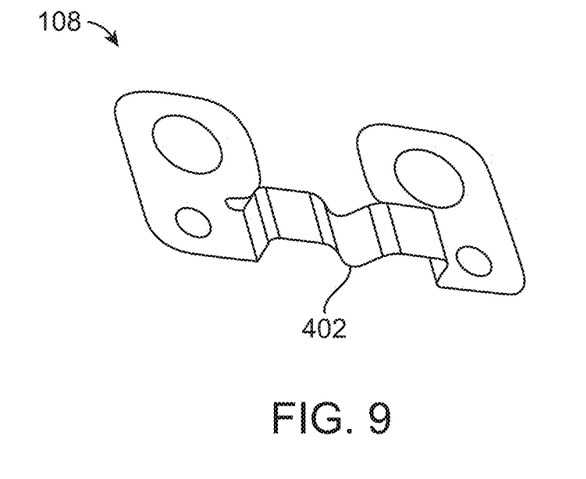
FIG. 9 shows a perspective view of an embodiment of a locking spring in isolation.

In some embodiments, features are provided on the mounting hook 104 and/or electronics housing 100 to help lock or retain the mounting hook 104 in the desired orientation and prevent unintentional movement of the mounting hook 104. By way only of example, locking springs 108 (see FIGS. 4, 5, and 9) may be provided on the upper surface 114 of the electronics housing 100. In some embodiments, the locking springs 108 are secured to the electronics housing 100 with screws, fasteners, or any other suitable securing mechanisms. In some embodiments, the mounting hub 105 rests at least partially atop the locking springs 108. In some embodiments, the mounting hub 105 can be secured to the electronics housing 100 with the same securing mechanism as is used to secure the locking springs 108. As best seen in FIG. 9, the locking springs 108 include at least one receiving slot 402 along their length.

As best seen in FIGS. 6 and 7, locking protrusions 106a, 106b (collectively 106) may be provided on the mounting hook 104 for engagement with the locking springs 108. In the illustrated embodiment, the locking protrusions 106 are provided on each arm 208. Location of the locking protrusions 106 on the mounting hook 104 may correspond to desired positions of the mounting hook 104. For example, locking protrusions 106 are provided on the first side 204 and on the distal end of the mounting hook 104 so as to respectively correspond to a stowed and an upraised position of the mounting hook 104. More specifically and in the illustrated embodiment, a first locking protrusion 106a extends from each arm 208 on the first side 204 of the mounting hook 104, and a second locking protrusion 106b extends from each arm 208 on a distal end of each arm 208. In some embodiments, the first and second locking protrusions 106a, 106b are oriented substantially 90° relative to each other but other orientations are certainly contemplated herein.

When the mounting hook 104 is in the stowed position, the first locking protrusions 106a are seated within the receiving slots 402 of the locking springs 108. Rotation of the mounting hook 104 upwardly slightly depresses the locking springs 108 such that the first locking protrusions 106a can clear and disengage from the receiving slots 402. The mounting hook 104 is able to rotate upwardly up and until the second locking protrusions 106b seat within the receiving slots 402, thereby retaining the mounting hook 104 in an upright orientation relative to the electronics housing 102. In this way, locking protrusions 106 snap-fit into the locking springs 108, such that their engagement and disengagement into and from the locking springs 108 requires an external force so as to prevent inadvertent movement of the mounting hook 104.

Note that while the illustrated embodiment includes two locking springs 108 and two locking protrusions 106 on each arm 208, in some embodiments only a single locking spring 108 and a single locking protrusion 106 on each arm 208 may be used. Moreover, other ways to effectuate locking of the mounting hook 104 and prevention of its inadvertent movement may be provided.

In some embodiments, the positions of the mounting hook 104 can correspond to a functional use, such as, for example, a stowed position and an installation position. For example, the mounting hook 104 can be moved to a stowed position for shipping (see FIG. 4), where the mounting hook 104 lies substantially flush with the upper surface 114 of the electronics housing 100. In some embodiments, the mounting hook 104 is shaped and sized such that it does not extend vertically upwardly or laterally outwardly beyond other features of the light fixture 10. In this way, pre-attachment of the mounting hook 104 to the light fixture 10 does not increase the product profile and/or footprint and thereby avoids increased shipping costs and storage requirements of the light fixture 10. Moreover, pre-mounting the mounting hook 104 on the light fixture 10 reduces the number of loose parts that must be packed and that may get lost in transit.

At the installation site the mounting hook 104 can be easily upraised from its stowed position and used to install the light fixture 10 on or within any mounting surface, including but not limited to a ceiling. In some embodiments, the mounting hook 104 may engage a chain or a carabiner. In some embodiments, a clip 300 (see FIG. 4) is provided on the hook portion 200 of the mounting hook 104 to prevent the mounting hook 104 from disengaging (i.e., backing out) from the mounting structure. Note that use of the mounting hook 104 for installation may not be desired in all circumstances. In some embodiments, the mounting hub 105 includes an aperture 306 for coupling other accessories to the light fixture 10. For example, eye bolts, eye bolt adapters, may be secured into the aperture 306 (which in some embodiments is threaded). The aperture 306 is easily accessed when the mounting hook 104 is in the stowed position.

The various aspects, embodiments, implementations or features of the described embodiments can be used separately or in any combination. In particular, it should be appreciated that the various elements or concepts from FIGS. 1-9 may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronics housing comprising:
   a housing body having an upper surface and a hook mounting hub exposed on the upper surface;
   a mounting hook comprising a hook portion and a hook base, wherein the hook base is rotatably coupled to the hook mounting hub on the housing body such that the mounting hook is adapted to rotate about a rotation axis from a stowed position whereby the hook portion of the mounting hook lies substantially adjacent to the upper surface of the housing body to an upraised position whereby the hook portion of the mounting hook extends upwardly from the upper surface of the housing body while the hook base remains rotatably coupled to the hook mounting hub; and
   a locking mechanism configured to retain the mounting hook in the upraised position.

2. The electronics housing of claim 1, wherein the locking mechanism is further configured to retain the mounting hook in the stowed position when the mounting hook engages the locking mechanism.

3. The electronics housing of claim 1, wherein the locking mechanism comprises at least one locking spring, the at least one locking spring comprising a receiving slot.

4. The electronics housing of claim 3, wherein the mounting hook comprises at least one locking protrusion adapted to engage the receiving slot to lock the mounting hook in the upraised position.

5. The electronics housing of claim 4, wherein the at least one locking spring comprises a first locking spring and a second locking spring, wherein the at least one locking protrusion comprises two first locking protrusions and two second locking protrusions, wherein the hook base comprises two hook arms, wherein each of the two hook arms comprises one of the two first locking protrusions and one of the two second locking protrusions, wherein each of the two first locking protrusions is adapted to engage the receiving slot of one of the first locking spring or the second locking spring when the mounting hook is in a stowed position and wherein each of the two second locking protrusions is adapted to engage the receiving slot of the one of the first locking spring or the second locking spring when the mounting hook is in an upraised position.

6. The electronics housing of claim 1, wherein the hook base comprises two hook arms and the mounting hook is rotatably coupled to the hook mounting hub by the two hook arms.

7. The electronics housing of claim 6, wherein each of the two hook arms comprises an engagement pin that engages at least one cavity defined by the hook mounting hub.

8. The electronics housing of claim 1, wherein the mounting hook is rotatable within an approximately 180° rotation range.

9. The electronics housing of claim 1, wherein the mounting hook is rotatable within an approximately 90° rotation range.

10. The electronics housing of claim 1, wherein the hook mounting hub comprises a rotation stop adapted to limit a rotation range of the mounting hook.

11. A light fixture comprising:
    at least one light emitting element;
    electronics for powering the at least one light emitting element; and
    a housing comprising:
      a housing body having an upper surface and a hook mounting hub exposed on the upper surface;
      a mounting hook comprising a hook portion and a hook base, wherein the hook base is rotatably coupled to the hook mounting hub on the housing body such that the mounting hook is adapted to rotate about a rotation axis from a stowed position whereby the hook portion of the mounting hook lies substantially adjacent to the upper surface of the housing body to an upraised position whereby the hook portion of the mounting hook extends upwardly from the upper surface of the housing body while the hook base remains rotatably coupled to the hook mounting hub; and
      a locking mechanism configured to retain the mounting hook in the upraised position.

12. The light fixture of claim 11, wherein the at least one light emitting element comprises a plurality of light emitting diodes.

13. The light fixture of claim 11, wherein the housing houses the electronics.

14. The light fixture of claim 11, wherein the locking mechanism is further configured to retain the mounting hook in the stowed position when the mounting hook engages the locking mechanism.

15. The light fixture of claim 11, wherein the locking mechanism comprises at least one locking spring, the locking spring comprising a receiving slot.

16. The light fixture of claim 15, wherein the at least one locking spring comprises a first locking spring and a second locking spring, wherein the hook base comprises two hook arms, wherein each of the two hook arms comprises one of two first locking protrusions and one of two second locking protrusions, wherein each of the two first locking protrusions is adapted to engage the receiving slot of one of the first locking spring or the second locking spring when the mounting hook is in a stowed position and wherein each of the two second locking protrusions is adapted to engage the receiving slot of the one of the first locking spring or the second locking spring when the mounting hook is in an upraised position.

17. The light fixture of claim 11, wherein the hook base comprises two hook arms and the mounting hook is rotatably coupled to the hook mounting hub by the two hook arms.

18. The light fixture of claim 17, wherein each of the two hook arms comprises an engagement pin that engages at least one cavity defined by the hook mounting hub.

19. The light fixture of claim 11, wherein the mounting hook is rotatable within an approximately 90° rotation range.

20. An electronics housing comprising:
a housing body having an upper surface and a hook mounting hub exposed on the upper surface and having a rotation stop;
a mounting hook comprising a hook portion, a hook base, and a locking protrusion, wherein the hook base is rotatably coupled to the hook mounting hub on the housing body such that the mounting hook is adapted to rotate about a rotation axis from a stowed position whereby the hook portion of the mounting hook lies substantially adjacent to the upper surface of the housing body to an upraised position whereby the hook portion of the mounting hook extends upwardly from the upper surface of the housing body while the hook base remains rotatably coupled to the hook mounting hub; and
a locking mechanism provided on the electronics housing and comprising at least one locking spring having a receiving slot,
wherein the locking protrusion on the mounting hook is adapted to engage the receiving slot on the at least one locking spring to retain the mounting hook in at least one of the stowed position or the upraised position and wherein the rotation stop on the hook mounting hub is adapted to limit a rotation range of the mounting hook about the rotation axis.

\* \* \* \* \*